Aug. 8, 1961  G. K. MURPHY  2,995,095
HIGH CAPACITY PRIVATE COMPARTMENT PASSENGER VEHICLE
Filed Dec. 9, 1958  2 Sheets-Sheet 1

INVENTOR
Goodrich K. Murphy
BY
Wm. R. Glisson
ATTORNEY

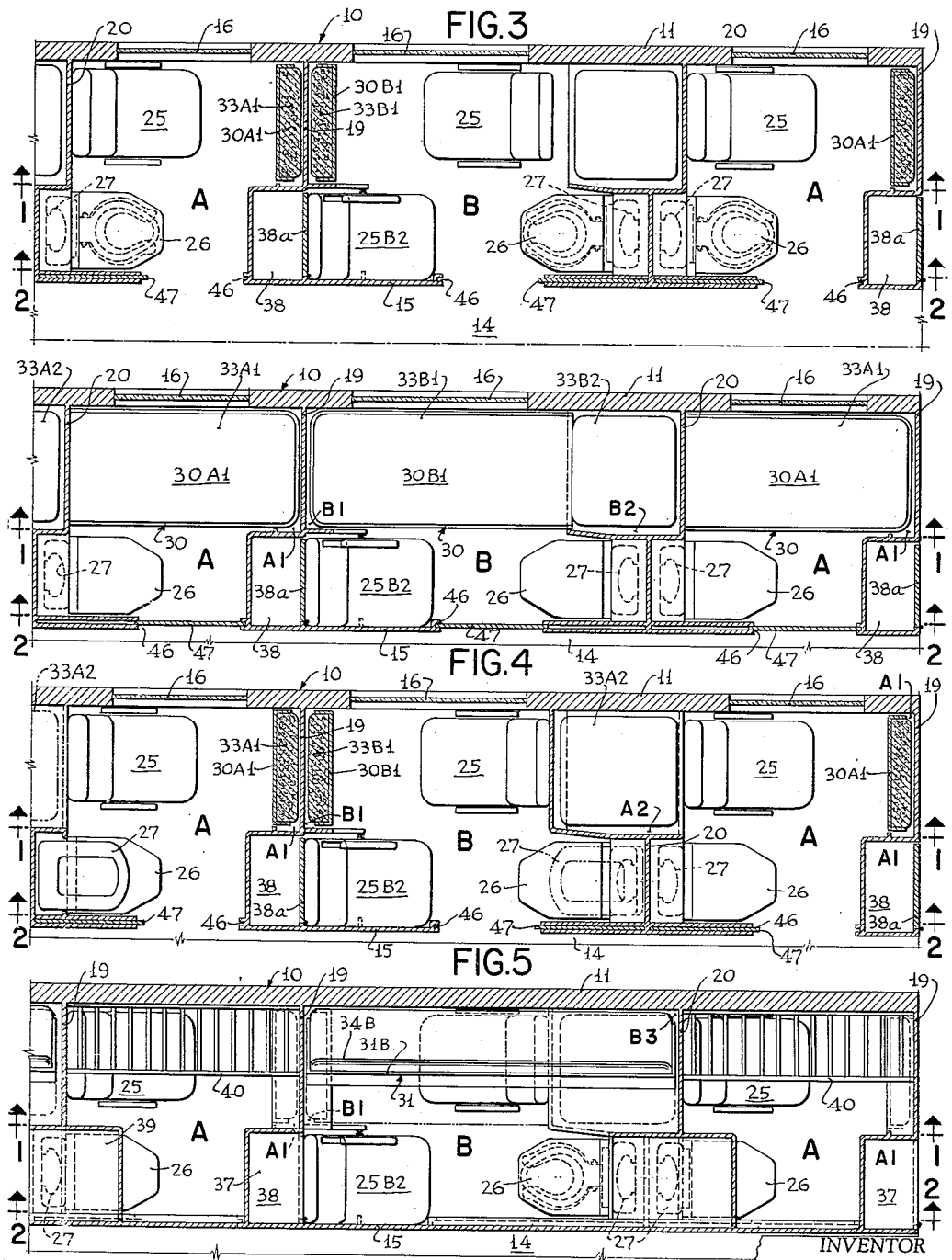

United States Patent Office 2,995,095
Patented Aug. 8, 1961

2,995,095
HIGH CAPACITY PRIVATE COMPARTMENT PASSENGER VEHICLE
Goodrich K. Murphy, New Canaan, Conn., assignor to The Budd Company, Philadelphia, Pa., a corporation of Pennsylvania
Filed Dec. 9, 1958, Ser. No. 779,184
1 Claim. (Cl. 105—315)

This invention relates to high capacity private compartment passenger vehicles which provide sitting, standing, sleeping and toilet facilities for each compartment and has for an object the provision of improvements in this art. The present invention is an improvement on the type of accommodation disclosed in my Patents 2,583,960 and 2,808,787.

In general, it is an object to provide a greater proportion of double-occupancy compartments in a regulation 85 foot car of standard width and height. Whether the double-occupancy compartments are actually sold for double occupancy or single occupancy, they are always available, and the space required and the construction expense involved are not much more than for a single-occupancy compartment. The available capacity for the car is increased by the present construction with practically the same comfort and convenience as in arrangements of lower capacity.

Another object is to provide multiple-compartment units or modules which have the largest possible proportion of simple transverse partition walls, which are either formed as single-plane walls or are offset in only a single direction, and which have the minimum proportion of more complex partition walls which are offset in two directions to form alcove-boot elements for bed accommodations.

In my copending application, Serial No. 540,300, now Patent No. 2,914,001, November 25, 1959, I have disclosed a three-compartment unit or module in which one of three transverse partition walls is offset to form boot-alcove elements for three bed levels and another transverse partition wall is offset to form boot-alcove elements for at least two bed levels, leaving one of the three transverse walls of simple shape. In the present arrangement there is a two-compartment unit or module having two transverse walls in which one transverse partition wall has offsets for boot-alcove elements to take beds at three levels and the other wall is of simple shape. So, while in the three-compartment three-wall unit, two or two-thirds of the transverse walls have a complex boot-alcove shape, in the present two compartment two-wall unit, one or only one half of the transverse walls have a complex boot-alcove shape.

In my patents and prior application I have disclosed high-capacity passenger accommodations which provide sitting, standing, sleeping and toilet accommodations in a compartment space which is less than reclining width, being about twice sitting width; which is in part of standing height and in part of less than standing height; and which is in part of reclining length and in part of less than reclining length.

When passenger size is referred to herein it means the size of a normal adult of about six feet height and average proportions, this being the size for which most passenger accommodations are designed. Double sitting width corresponds to the space in a normal railway passenger car between a center aisle wall and a side wall.

In the first-mentioned patent the compartments include bed-space alcoves which project as boots into the adjacent space, the boots being arranged in horizontally staggered disposition. This arrangement has the advantage that all compartment floors are on a common level coinciding with the center aisle floor level but the disadvantage is that in some rooms the bed in the use position is located between the standing space and the aisle.

In the second-mentioned patent the boots are arranged in vertically staggered disposition. This has the advantage that in every compartment the bed space is located at the outer wall, leaving free access between the bed and the aisle. Some rooms have a floor level above the aisle floor level but the step height is small and not inconvenient. The beds are on two levels and all of the rooms are for single sleeping occupancy.

In the pending application, as stated above, the compartments or rooms are arranged in basic groups, units or modules of three instead of two and on three bed levels instead of two. It provided one double-occupancy compartment in each group of three compartments.

The present invention by a judicious arrangement combines desirable features from all of the other arrangements and provides higher capacity and a greater proportion of double-occupancy compartments and simple partition walls than any of the other arrangements.

It provides all compartment floors at aisle floor level (although, as will be mentioned, the floor of one compartment may be raised slightly to shorten the floor-to-bed height) like the first patent but without the aisle-side bed obstruction; it provides all beds at the outside wall side like the second patent but without the considerable floor elevation for one compartment; and it provides a double-occupancy compartment and a three-bed level arrangement of the pending application but with a smaller proportion of complex partition walls. Besides it has all windows at a common level; has one seat in each compartment at the outside wall side; has a toilet in each compartment at the aisle wall side, has a basin and mirror in each compartment; has ample bag space in each compartment; has an extra seat in the double-occupancy compartment; has an ample wardrobe in the double-occupancy compartment; and provides beds which have a long rigid head portion which supports all or most of the body.

The stated and other objects and advantages of the invention will be apparent from the following description of an exemplary embodiment, reference being made to the accompanying drawing, wherein:

FIG. 3 is a horizontal section and plan view taken on the line 3—3 of FIGS. 1 and 2;

FIG. 4 is a view like FIG. 3 but showing the parts in position for night use.

Figure 1:
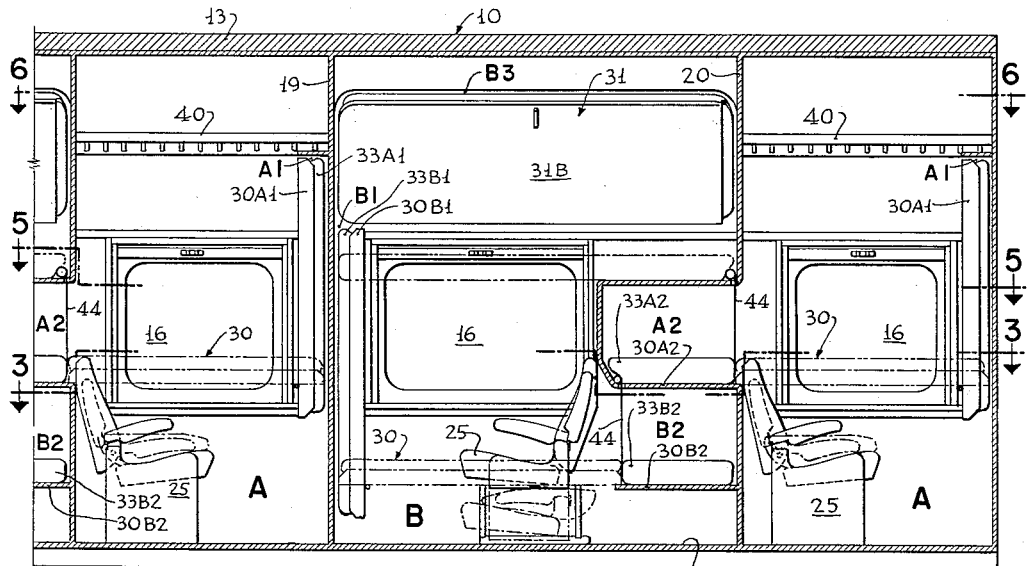
FIG. 1 is a vertical longitudinal section through a car equipped with the present accommodations, the section being taken on the line 1—1 of FIGS. 3, 4, 5 and 6.
Figure 2:
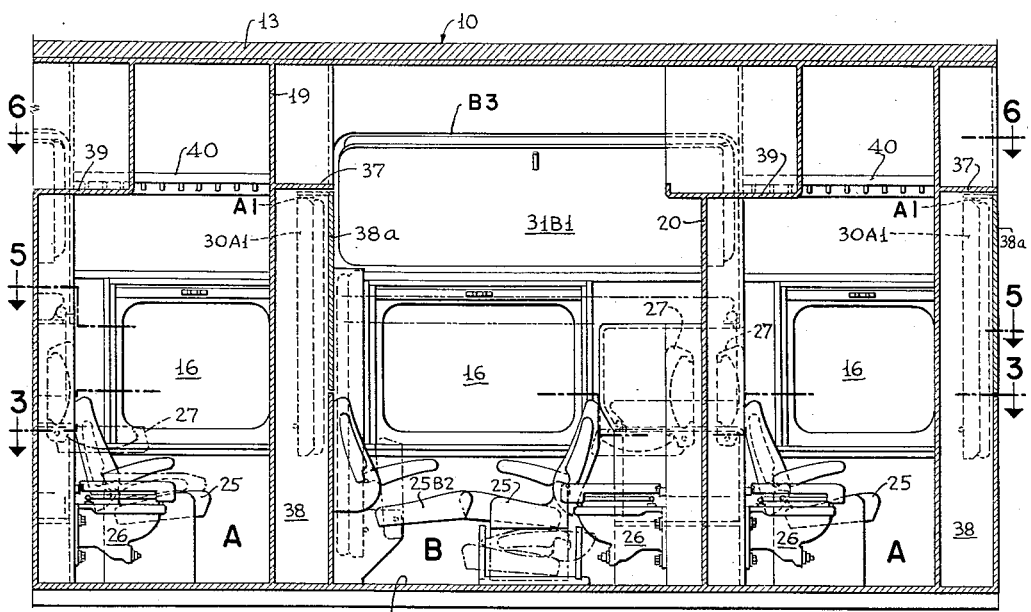
FIG. 2 is a vertical longitudinal section taken on the line 2—2 of FIGS 3, 4, 5 and 6.

FIG. 5 is a horizontal section and plan view taken on the line 5—5 of FIGS. 1 and 2; and FIG. 6 is a horizontal section and plan view taken on the line 6—6 of FIGS. 1 and 2.

As shown in the drawings, a railway car 10 has longitudinal outer sidewalls 11 (one of which is shown), a floor 12, a roof 13, a center aisle 14, aisle walls 15, and windows 16. Between the aisle wall 15 and the side wall 11 on each side there are provided a plurality of transverse partition walls 19 and 20 dividing the space into a plurality of separate passenger compartments A and B, constituting a group unit or module which can be repeated indefinitely. For example, a standard 85 foot railway car will take fourteen such units, seven on each side which furnish fourteen singles and fourteen doubles to accommodate forty-two passengers in a car, with a general toilet, electric locker, linen lockers, vestibule space, etc., as needed.

In each compartment there is arranged on the outer side wall side a folding seat 25, on the inner side a fixed longitudinally facing toilet 26, folding wash basin 27, and above it a mirror, and on the outer wall side in a vertical bed zone a bed 30. The bed elements of the two compartments are somewhat different so that will be designated by a suffix A or B, to show the room which they serve. The bed parts are much alike but of somewhat different relative length in the two compartments.

In room A there is a relatively long rigid head-end bed frame part 30A1 which supports most of the length of the body and which turns about a horizontal hinge line at the head end to fold up into an alcove A1 at partition wall 19. This carries a mattress part 33A1. At wall 20 there is a boot-alcove A2 having a floor 30A2 forming a relatively short fixed bed supoprt for a mattress part 33A2.

In room B there is a relatively long rigid head-end bed part 30B1 which supports most of the length of the body and which turns about a horizontal hinge line at the head end to fold up into an alcove B1 at partition wall 19. This carries a mattress part 33B1. At wall 20 there it a boot-alcove B2 having a floor 30B2 forming a relatively short fixed bed support for a mattress part 33B2.

In room B there is also an upper bed 31 comprising an edge-hinged frame part 31B with a mattress part 34B stowable in a side wall and ceiling recess B3. The bed frame 31B is full sleeping length.

In room B there is a second seat 25B2 on the aisle side in front of the toilet. The space between the bed parts 30A1 and 30B1, both of which fold against wall 19, and the aisle wall behind the seat 25B2 forms a wardrobe 38 for room B, a door 38a above the seat back providing access to the wardrobe.

A bag rack 40 is provided in room A above the upper end of the alcove A1 for the folded bed part. The top of wardrobe 38 provides a bag shelf 37 for room B. Wall 20 is offset both forwardly and rearwardly on the aisle side of the space for bed 31 to form a bag shelf 39. Roll curtains 44 are provided to close off the alcoves A2 and B2 to protect the bedding when stowed therein.

The seat 25 in room B is shown as a known full-folding type which can be lowered sufficiently to be positioned below the lower bed in use position. This seat may be fixed in position but is of the type which is often moved about in the room. It is shown with its back to wall 20 to give the maximum window space but it may be put against the folded bed part at wall 19 and in this case will give more foot space though somewhat less window space.

The toilet seat cover in room B, when folded down, provides a convenient step to assist in using the upper bed 31. Other step elements can be provided above the toilet seat cover if desired.

Each compartment is provided with an aisle doorway 46 closed by a door 47.

By the present arrangement the major bed parts 30A1 and 30B1 for both compartments are folded against the plainer wall 19 and the bed alcoves for the minor foot-end bed parts are all arranged at the more irregular wall 20. At wall 20 there are three overlapping bed levels; at wall 19 no bed parts overlap. The toilets of both rooms and the cabinets for the basin-mirror and the like are also located at wall 20.

The floor-to-bed height in room A may be lessened by having a floor about one step above aisle floor level in which case, for most comfort, since the seat level is raised, it may be desirable to raise the window level correspondingly.

It is thus seen that the invention provides simple, convenient and economical high-capacity accommodations for a vehicle, particularly a railway passenger car. And while one embodiment has been described it is to be understood that there may be various embodiments within the general scope of the invention.

What is claimed is:

In a passenger carrying vehicle, in combination; a longitudinally extending outer side wall; a longitudinally extending aisle wall; a plurality of longitudinally spaced transverse partition walls dividing the space between a side wall and an aisle wall into a plurality of passenger occupancy compartments arranged in a group of two compartments adapted for repetition along the length of the vehicle; each compartment being of approximately double sitting width and the length of the unit group of two compartments being considerably less than two times a single sleeping length; each compartment having a floor at a height at least as high as and near aisle floor level; one of the two compartments being arranged for double occupancy and one for single occupancy; the double occupancy compartment having its floor at aisle floor level; an outside wall window in each compartment, the windows of the compartments being near the same level; an aisle door for each compartment; a longitudinally facing folding seat in each compartment; one of said transverse walls being formed with longitudinally offset zig-zag portions in an outer vertical bed zone adjacent the outer side wall providing three vertically spaced superposed bed boot-alcoves in a vertical alcove zone, each with a horizontal foot-end bottom wall or floor underlying a part of a full-length bed space; the bed zone being approximately half the compartment width; bed accommodations in said bed zone providing three full-length beds each having a part thereof disposed for use in one of said boot-alcoves; the two lower beds each having a bed part of considerably greater length than half bed length hinged at its lower end at a wall opposite to said one wall on a transverse axis to swing down past and near a closed corner of an upper boot-alcove to a use position with its free end disposed close to the front end of the bottom wall or floor of one of the two lower boot-alcoves; a fixed foot-end bed part in each of the two lower boot-alcoves which forms with the mating hinged part a full length bed; the outer wall seats of said compartments being disposed with their backs toward the boot-alcoves of said one wall; the end-hinged bed part in the double occupancy compartment, when stowed in vertical position, having its lower end disposed near the floor and its upper end disposed in part of the use-position space of the upper bed zone; an upper bed part having a length at least as great as that of the hinged lower bed parts, the upper bed part being hinged at its lower longitudinal edge to swing from a stowed position, above the upper end of the hinged lower bed part, down to a use position at the bottom wall or floor of the top boot-alcove; and the hinged bed part of the single-occupancy compartment having its lower end, when stowed, disposed a considerable distance above the floor level and above the bottom of the lowest boot-alcove and the space between the lower end of said hinged bed part and the floor of the compartment being open and clear to provide foot space in front of the seat and to allow the bed part when folded down to match a bed part in the intermediate boot-alcove to provide a full-length bed.

References Cited in the file of this patent

UNITED STATES PATENTS

| | | |
|---|---|---|
| 2,464,749 | Murphy | Mar. 15, 1949 |
| 2,544,980 | Brown | Mar. 13, 1951 |
| 2,556,140 | Lyon | June 5, 1951 |
| 2,600,706 | Tully et al. | June 17, 1952 |
| 2,808,787 | Murphy | Oct. 8, 1957 |
| 2,914,001 | Murphy | Nov. 24, 1959 |
| 2,914,002 | Murphy | Nov. 24, 1959 |
| 2,946,294 | Murphy | July 26, 1960 |